(12) United States Patent
Pendarakis et al.

(10) Patent No.: US 10,171,452 B2
(45) Date of Patent: Jan. 1, 2019

(54) SERVER AUTHENTICATION USING MULTIPLE AUTHENTICATION CHAINS

(71) Applicant: International Business Machines Corporation, Armonk, NY (US)

(72) Inventors: Dimitrios Pendarakis, Westport, CT (US); Enriquillo Valdez, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/087,486

(22) Filed: Mar. 31, 2016

(65) Prior Publication Data

US 2017/0289137 A1   Oct. 5, 2017

(51) Int. Cl.
   *H04L 29/06* (2006.01)

(52) U.S. Cl.
   CPC ...... *H04L 63/0823* (2013.01); *H04L 63/0435* (2013.01)

(58) Field of Classification Search
   USPC .......................................................... 713/157
   See application file for complete search history.

(56) References Cited

U.S. PATENT DOCUMENTS

| | | | | |
|---|---|---|---|---|
| 5,610,982 A * | 3/1997 | Micali | ................... | H04L 9/3255 380/286 |
| 6,141,705 A * | 10/2000 | Anand | ................... | G06F 9/5044 709/203 |
| 6,356,937 B1 * | 3/2002 | Montville | ............ | G06Q 10/109 709/206 |
| 7,240,366 B2 * | 7/2007 | Buch | ................. | H04L 29/06027 380/225 |
| 7,363,632 B2 * | 4/2008 | Wong | .................... | G06F 9/4413 719/313 |
| 7,523,399 B2 * | 4/2009 | Britt, Jr. | .................... | G06F 8/60 715/740 |
| 7,574,713 B2 * | 8/2009 | Tabares | ................. | G06F 9/4411 710/10 |
| 7,814,200 B2 * | 10/2010 | Lusher | ................. | H04L 67/306 709/224 |

(Continued)

FOREIGN PATENT DOCUMENTS

WO   WO-2004008781 A2 *   1/2004   ............... G06F 8/65

*Primary Examiner* — Taghi T Arani
*Assistant Examiner* — badridot champakesan
(74) *Attorney, Agent, or Firm* — Jeffrey S. LaBaw; David H. Judson

(57) ABSTRACT

A client seeking to establish a cryptographically-secure channel to a server has an associated public key acceptance policy. The policy specifies a required number of certificates that must be associated with the server's public key, as well as one or more conditions associated with those certificates, that must be met before the client "accepts" the server's public key. The one or more conditions typically comprise a trust function that must be satisfied before a threshold level of trust of the client is met. A representative public key acceptance policy would be that certificate chains for the public key are valid and non-overlapping with different root CAs, and that some configurable number of those chains be present. The technique may be implemented within the context of an existing client-server SSL/TLS handshake.

14 Claims, 5 Drawing Sheets

(56) References Cited

U.S. PATENT DOCUMENTS

| | | | | |
|---|---|---|---|---|
| 7,831,633 B1* | 11/2010 | Chan | G06F 17/30569 | 707/803 |
| 8,065,673 B2* | 11/2011 | D'Souza | G06F 9/485 | 709/203 |
| 8,214,638 B1* | 7/2012 | Karp | H04L 9/0825 | 380/285 |
| 8,224,971 B1* | 7/2012 | Miller | H04L 12/4641 | 370/254 |
| 8,230,215 B2* | 7/2012 | Laberteaux | H04L 9/3268 | 180/173 |
| 8,438,315 B1* | 5/2013 | Tao | G06F 9/4411 | 710/5 |
| 8,539,515 B1* | 9/2013 | Protassov | G06F 9/4411 | 711/6 |
| 8,607,040 B2* | 12/2013 | Zimmer | G06F 1/3203 | 713/2 |
| 8,918,547 B2* | 12/2014 | Cawse | G06F 13/385 | 710/15 |
| 8,949,815 B2* | 2/2015 | Phaedrus | G06F 8/65 | 717/168 |
| 9,104,412 B2* | 8/2015 | Lynar | G06F 1/329 | |
| 9,268,959 B2* | 2/2016 | Paczkowski | G06F 21/74 | |
| 9,509,659 B2* | 11/2016 | Anipko | H04L 29/12264 | |
| 9,647,835 B2* | 5/2017 | Gero | H04L 9/28 | |
| 9,736,145 B1* | 8/2017 | Hayes | H04L 63/0823 | |
| 2002/0038291 A1* | 3/2002 | Petersen | G06F 21/33 | 705/67 |
| 2002/0161919 A1* | 10/2002 | Boucher | H04L 29/06 | 709/238 |
| 2003/0027563 A1* | 2/2003 | Herle | G06F 8/65 | 455/419 |
| 2003/0056114 A1* | 3/2003 | Goland | H04L 63/04 | 726/5 |
| 2003/0084435 A1* | 5/2003 | Messer | G06F 9/505 | 717/174 |
| 2003/0195951 A1* | 10/2003 | Wittel, Jr. | H04L 67/34 | 709/220 |
| 2003/0204720 A1* | 10/2003 | Schoen | H04L 51/04 | 713/153 |
| 2004/0148505 A1* | 7/2004 | Qiu | G06F 21/33 | 713/175 |
| 2004/0181469 A1* | 9/2004 | Saeki | H04L 29/06 | 705/30 |
| 2005/0017946 A1* | 1/2005 | Park | G06F 1/1601 | 345/156 |
| 2005/0071746 A1* | 3/2005 | Hart | G06F 3/1206 | 715/200 |
| 2005/0120205 A1* | 6/2005 | Umezawa | H04L 63/0442 | 713/156 |
| 2005/0198508 A1* | 9/2005 | Beck | H04L 51/12 | 713/170 |
| 2005/0278459 A1* | 12/2005 | Boucher | H04L 29/06 | 709/250 |
| 2006/0059333 A1* | 3/2006 | Gentry | H04L 9/3236 | 713/156 |
| 2006/0130053 A1* | 6/2006 | Buljore | H04W 8/245 | 717/173 |
| 2006/0236098 A1* | 10/2006 | Gantman | H04L 63/0478 | 713/158 |
| 2007/0008327 A1* | 1/2007 | Howell | G06T 1/00 | 345/506 |
| 2007/0130352 A1* | 6/2007 | Chhabra | H04L 63/0485 | 709/230 |
| 2007/0135866 A1* | 6/2007 | Baker | A61B 5/0002 | 607/60 |
| 2009/0222497 A1* | 9/2009 | Ryan | G06F 8/65 | |
| 2009/0287935 A1* | 11/2009 | Aull | H04L 9/3263 | 713/182 |
| 2010/0017593 A1* | 1/2010 | Putz | H04L 9/3073 | 713/150 |
| 2010/0037293 A1* | 2/2010 | StJohns | H04L 63/20 | 726/2 |
| 2010/0242037 A1* | 9/2010 | Xie | G06F 8/61 | 717/178 |
| 2011/0252459 A1* | 10/2011 | Walsh | G06F 21/33 | 726/4 |
| 2011/0276724 A1* | 11/2011 | Mullis, II | G06F 9/4415 | 710/8 |
| 2012/0250682 A1* | 10/2012 | Vincent | H04L 12/4633 | 370/390 |
| 2012/0250686 A1* | 10/2012 | Vincent | H04L 12/4633 | 370/392 |
| 2012/0290830 A1* | 11/2012 | Resch | H04L 9/0841 | 713/150 |
| 2013/0159702 A1* | 6/2013 | Peeters | H04L 9/3268 | 713/156 |
| 2013/0198519 A1* | 8/2013 | Marien | G06F 21/34 | 713/172 |
| 2013/0298192 A1* | 11/2013 | Kumar | G06F 21/52 | 726/3 |
| 2013/0326493 A1* | 12/2013 | Poonamalli | G06F 8/65 | 717/168 |
| 2014/0189861 A1* | 7/2014 | Gupta | H04L 63/08 | 726/22 |
| 2014/0229384 A1* | 8/2014 | St. Johns | H04L 9/3268 | 705/50 |
| 2014/0359281 A1* | 12/2014 | Saboori | H04L 63/0823 | 713/156 |
| 2015/0138094 A1* | 5/2015 | Kim | G06F 1/1632 | 345/168 |
| 2015/0248283 A1* | 9/2015 | Gschwind | G06F 9/4416 | 717/172 |
| 2016/0119362 A1* | 4/2016 | van Roermund | G06F 21/6209 | 713/166 |
| 2016/0294851 A1* | 10/2016 | Langton | H04L 63/1416 | |
| 2016/0316314 A1* | 10/2016 | Swaminathan | H04L 67/26 | |
| 2016/0359842 A1* | 12/2016 | Solodovnikov | G06F 21/56 | |
| 2016/0366167 A1* | 12/2016 | Yumer | H04L 63/1425 | |
| 2017/0054654 A1* | 2/2017 | Garg | H04L 43/0817 | |
| 2017/0149951 A1* | 5/2017 | Antonopoulos | H04M 1/72527 | |
| 2017/0199559 A1* | 7/2017 | Bengualid | G06F 1/329 | |
| 2017/0289137 A1* | 10/2017 | Pendarakis | H04L 63/0435 | |

* cited by examiner

SERVER AUTHENTICATION USING MULTIPLE AUTHENTICATION CHAINS

BACKGROUND

Technical Field

This disclosure relates generally to protecting security systems against compromise of trust anchors, such as Certificate Authorities (CAs).

Background of the Related Art

A certificate authority or certification authority (CA) is an entity that issues digital certificates. A digital certificate certifies the ownership of a public key by a named subject (e.g., a server domain) of the certificate. The existence of a digital certificate enables others to rely upon digital signatures or other assertions made about a private key that corresponds to the certified public key. Certificate Authorities (CAs) are considered a "trust anchor" because they maintain the private key used to sign certificates. In addition, typically CAs use the RSA public key algorithm for signing, and this algorithm is believed to be secure for sufficiently large key sizes.

In several publicized events, attackers have exploited vulnerabilities in certificate authorities, which have allowed them to generate valid certificates (i.e., getting their code or public keys signed by a CA). Using these valid certificates, attackers have validated malware, impersonated legitimate web sites (e.g., Yahoo®, Google® and others), and performed man-in-the-middle (MITM) attacks, thereby allowing them to obtain sensitive user information, such as login/password, email accounts, and the like.

There are a number of current approaches to address this problem. One approach is to mark or remove certificates using certificate revocation lists. Another is to provide on-line certificate status, or to provide higher assurances with respect to issuing the certificate (e.g., Extended Validation Secure Sockets Layer (SSL) certificates). Public key pinning is an approach by which domain owners specify a set of public keys that must be present in the host's certificate chain when establishing a Transport Layer Security (TLS) connection. The Domain Name System (DNS)-Based Authentication of Named Entities (DANE) solution associates public keys with particular server names. The Trust Assertions for Certificate Key (TACK) solution pins hostnames to special public keys that are used to validate server TLS public keys.

Many of these approaches, such as certificate revocation lists (CRL) and on-line certificate status, are only useful after a compromised CA signing key has been detected and flagged. Others present complex implementation issues or scalability challenges, in part because notifying and updating possible affected clients in a very short period of time to avoid widespread attacks is often very difficult.

There remains a need to provide enhanced techniques to make it more difficult for an attacker to compromise a trust anchor and thereby obtain access to what should otherwise be protected communications between a client and a server.

BRIEF SUMMARY

According to this disclosure, a client seeking to establish a cryptographically-secure channel to a server has an associated public key acceptance policy. The policy specifies a required number of certificates that must be associated with the server's public key, as well as one or more conditions associated with those certificates, that must be met before the client "accepts" the server's public key. The one or more conditions typically comprise a trust function that must be satisfied before a threshold level of trust of the client is met. A representative public key acceptance policy would be that certificate chains for the public key are valid and non-overlapping with respect to intermediate and root CAs, and that some configurable number of those chains be present. Where additional safeguards are desired, the client's public key acceptance policy may include a more complex trust function.

Initially, a server is first configured for a potential interaction with a client having the associated public key acceptance policy by requesting certificates (for its public key) from a set "n" distinct certificate authorities that are trusted by clients, where n is 2 or more. The server obtains n certificates for its public key issued by different CAs. Later, when the client seeks to establish a secure channel with the server, and preferably a client-server handshake, the server provides the n certificates for the server's public key to the client. Conveniently, this operation occurs in a client-server certificate exchange. The client receives the certificates and determines their validity. If the certificates are valid, the client applies its public key acceptance policy to determine if the trust function is satisfied. If so, the server public key is considered to be trusted and the handshake can be completed.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
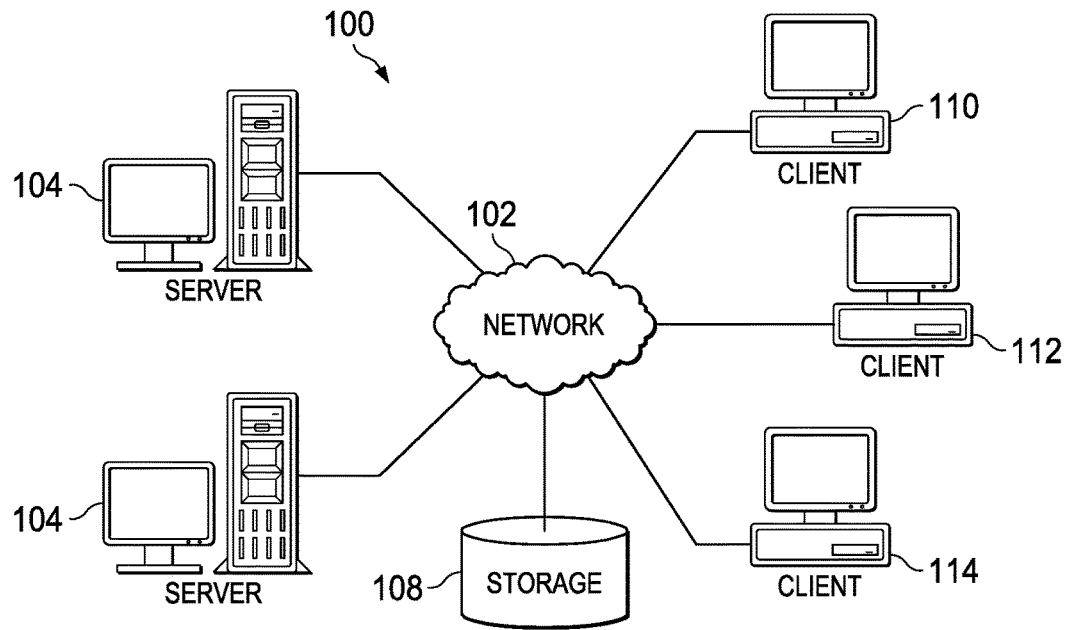
FIG. 1 depicts an exemplary block diagram of a distributed data processing environment in which exemplary aspects of the illustrative embodiments may be implemented.
Figure 2:
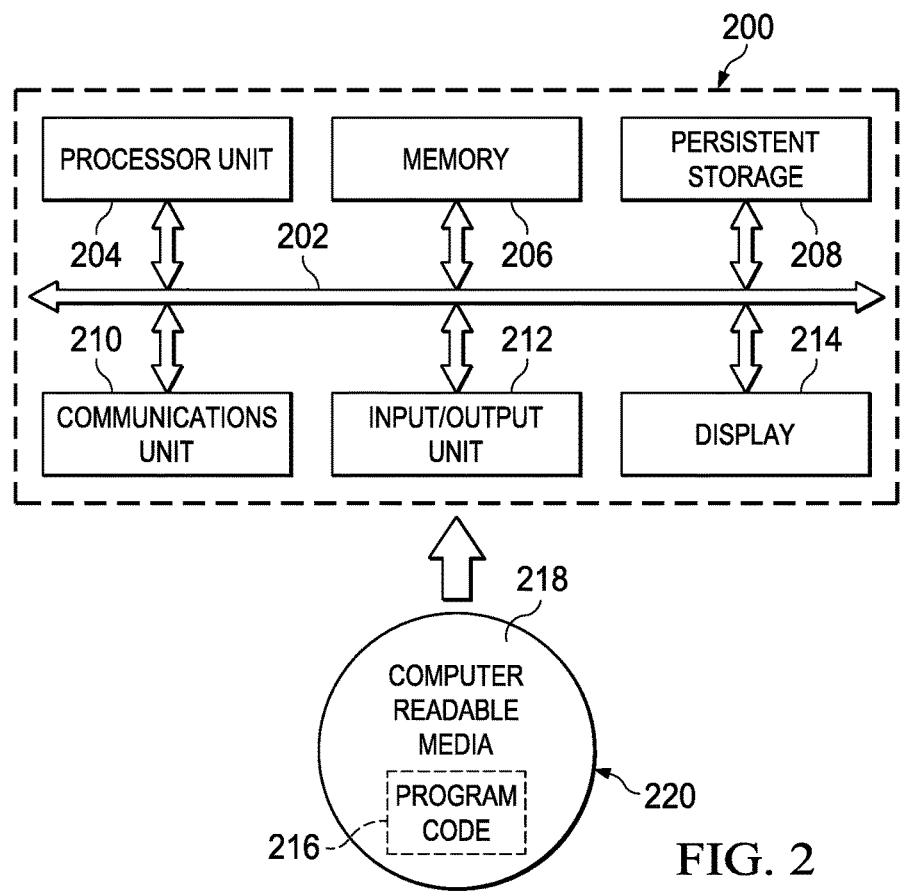
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Digital Certificates

As noted above, a certificate authority or certification authority (CA) is an entity that issues digital certificates, which typically are used to enable secure connections to a server over networks such as the Internet. Public-key infrastructures (PKI) rely on the existence of certificate authorities that issue digital certificates. A digital certificate certifies ownership of a public key by an entity that is the named subject in the certificate. Digital certificates enable others to rely upon an assertion made about a private key that corresponds to the public key. A CA thus is a trusted third party (or trust anchor) that is trusted both by the certificate owner, but also by the entity (such as a client) that relies on the certificate. In a typical operation, and with reference to FIG. 2, during an attempt a secure channel between client and server (e.g., over SSL/TLS), a client uses the CA certificate to verify a CA signature on the server certificate. Typically, client software (such as a web browser) includes a set of trusted CA certificates.

Before issuing an applicant a digital certificate, the CA must verify an applicant's credentials so that users and other relying parties can trust the information in the CA's certificates. Once it does so, the CA issues digital certificates that contain a public key and the identity of the applicant/owner, and the matching private key is not made available publicly. As noted above, the certificate serves as a validation by the CA that the public key contained in the certificate belongs to the person, organization, server or other entity noted in the certificate. If the user trusts the CA and can verify the CA's signature, it assumes that the public key in the certificate belongs to the entity identified in the certificate. A single CA certificate may be shared among multiple CAs or other permitted entities.

Digital certificates are verified using chain of trust. The trust anchor for the digital certificate is a root certificate authority (CA). A certificate hierarchy specifies a sequence of certificates that allows individuals to verify the validity of a certificate's issuer. A root CA certificate may be a base to issue multiple intermediate CA certificates with varying validation requirements. A certificate chain has a hierarchical relationship and describes a certification path. In its simplest embodiment, a certificate chain consists of a single certificate. As noted, a certificate chain specifies a certification path for validating a certificate in which a certificate in the sequence (path) can be verified by using the public key of the next certificate in the sequence. A certificate chain starts with the entity's (e.g., server's) certificate followed by one or more intermediate CAs, and ends with the CA's certificate.

Digital certificates may be of various types. An X.509 digital certificate is an International Telecommunications Union (ITU) standard that has been adopted by the Internet Engineering Task Force (IETF) body. It cryptographically binds the certificate holder, presumably the subject name within the certificate, with its public cryptographic key. This cryptographic binding is based on the involvement of the CA, which is the trusted entity in the Public Key Infrastructure (PKI). As a result, a strong and trusted association between the certificate holder and its public key can become public information yet remain tamper-proof and reliable. An important aspect of this reliability is a digital signature that the computes over a certificate before it is released for use. Subsequently, whenever the certificate is presented to a system for use of a service, its signature is verified before the subject holder is authenticated. After the authentication process is successfully completed, the certificate holder may be provided access to certain information, services, or controlled resources, i.e. the certificate holder may be authorized to access certain systems.

Server Authentication Using Multiple Certificate Chains

With the above as background, the subject matter of this disclosure is now described.

Figure 3:
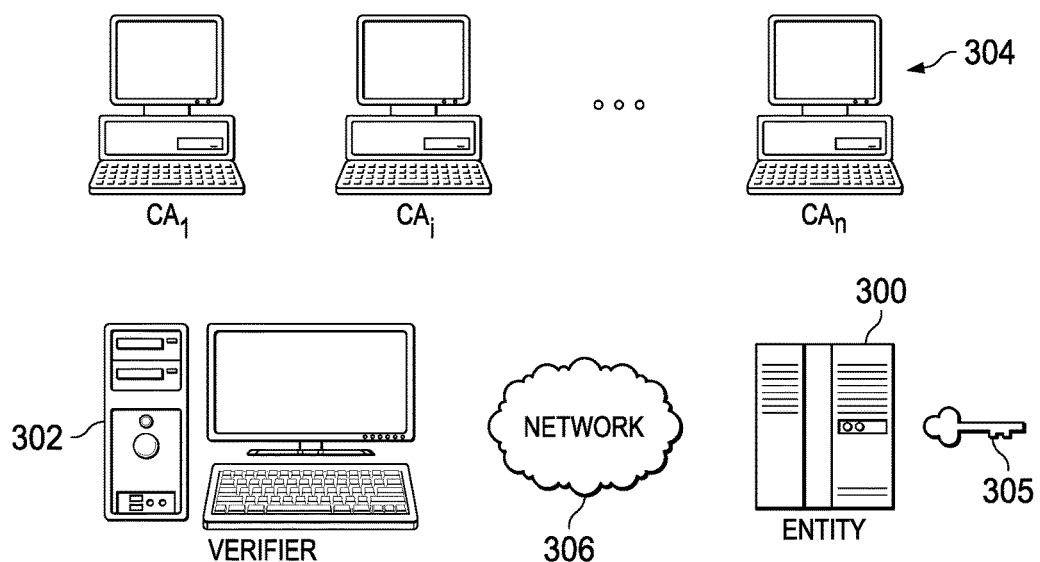
FIG. 3 depicts a basic operation of the technique of this disclosure whereby an entity's public key is evaluated by a verifier seeking to establish a secure channel to the entity.

FIG. 3 depicts the basic operating scenario. In particular, there is an entity 300 with multiple certificate chains for its public key 305, and a verifier 302 that knows the public keys of the issuers (certificate authorities 304) of the certificate chains. Typically, the entity 300 is a web or application server associated with a domain or other computing host, and the verifier 302 is a client, such as a client machine running a web browser, a mobile app, or the like. A client machine is not limited to an end user client, as a "client" in this context may itself be a server (e.g., an intermediary web server) that interacts with another (e.g., a gateway or origin server). Thus, the notion of "client" and "server" here are merely relative terms (endpoints of the communications) and not necessary limited to some particular type of entity.

The entity 300 generates a public key pair comprising a secret private key and its corresponding public key, which is key 305 as shown. As explained above, the entity 300 gets its public key 305 signed by a certificate authority 304, which issues a certificate for the entity's public key. Verifier 302 is coupled to entity 300 over a network 306, such as the publicly-routed Internet. As is well-known, verifier may attempt to establish a secure channel to the entity 300 via protocols such as Secure Sockets Layer (SSL)/Transport Layer Security (TLS), with the underlying transport being HTTP over TCP/IP. Once the secure channel is established, communications between the two endpoint occur over HTTPS/TCP/IP, all in a known manner. Details of these protocols is presumed, and the above-example is not intended to be limiting.

The technique of this disclosure typically operates during the attempt to establish this secure channel (e.g., during the SSL/TLS handshake), although likewise this is not a limitation. The interactions described above may operate in a standalone manner, or they may be carried out in association with other communications protocols, methods or systems.

The basic operation of the verifier 302 is to determine whether to accept the public key 305 of the entity 300. According to this disclosure, the verifier 302 (knowing the public keys of the CAs 304 of the certificate chains) accepts the public key 305 of the entity by evaluating multiple valid certificate chains presented to the verifier 302 by the entity 300. Preferably, the certificate chain comprises a number of certificates, wherein the certificates have a hierarchical relationship describing a certification path for verifying the entity's public key. In a preferred embodiment, the entity 300 acquires multiple certificate chains with non-overlapping root or intermediate certificate authorities among the certificate chains. The verifier 302 receives these certificates and computes an acceptance policy over the valid certificate chains presented by the entity. The valid certificate chains are ones whose digital signatures can be verified by using the certificate authority public keys. The result of the evaluation is either accept or reject the public key of the entity. The acceptance policy preferably employs a trust function. The trust function accepts the entity public key if K out of N certificate chains are issued by trusted certificate authorities, where K is at least two and N is the total number of certificate chains. In an alternative, the trust function accepts the entity public key if a computed weighted trust metric derived from the reputation of the certificate authorities exceeds a predetermined threshold value.

Figure 4:
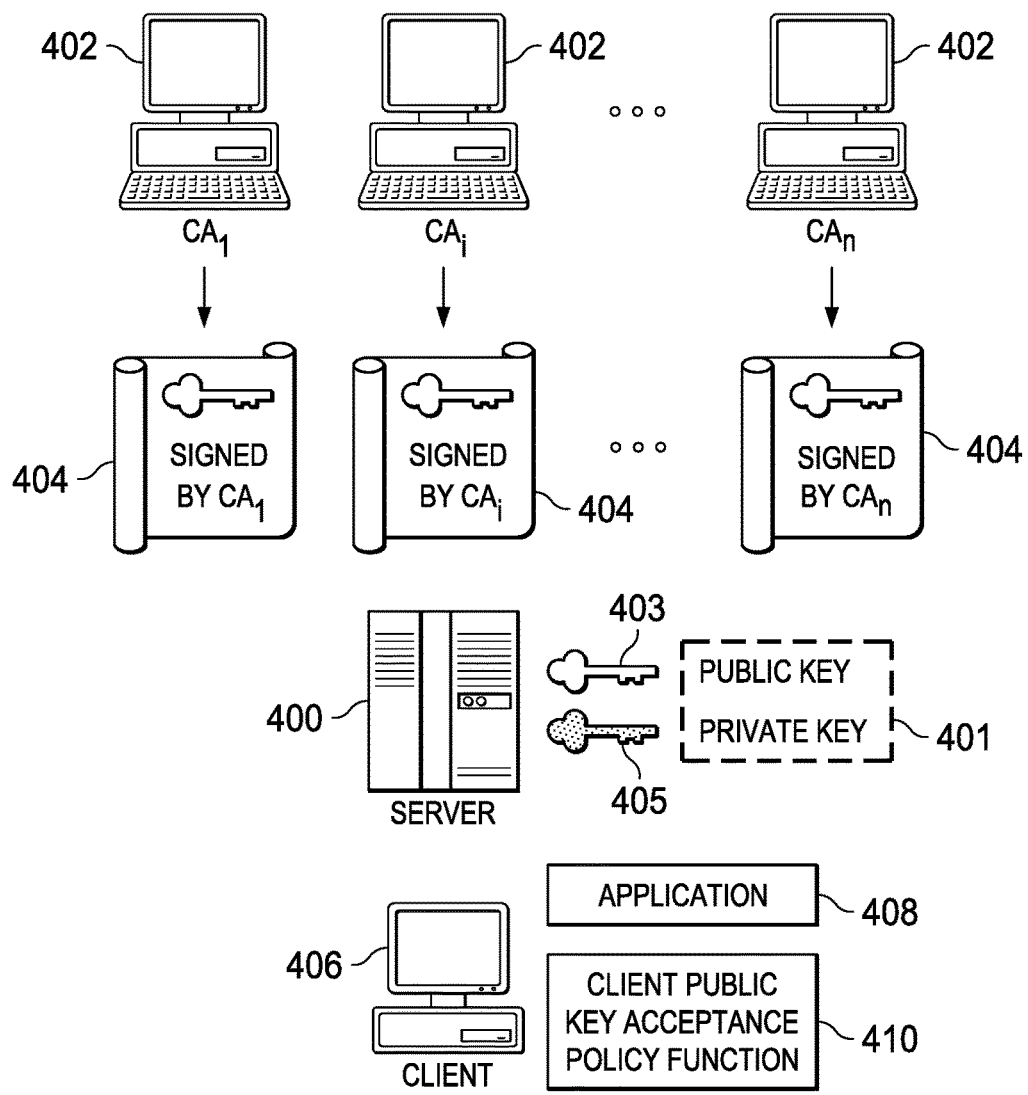
FIG. 4 depicts a server interaction with a set of certificate authorities to obtain a set of certificates for use in the layered defense approach of this disclosure.

As depicted in FIG. 4, a server 400 has associated therewith a set of certificate authorities 402. The 400 has an associated public key pair 401 comprising a public key 403 and its associated private key 405. Each certificate authority 402 generates a digital certificate 404. In this example, there are "n" certificate authorities $\{CA_1, CA_i \ldots CA_n\}$, where n is 2 or more. There is no constraint on the number of certificate authorities that may be associated with the server (and that provide certificates). As depicted, the digital certificate includes the digital signature of the server public key 403 as signed by the particular CA. The server 400 request the certificates 404 from the multiple CAs 402, and it receives and stores those certificates securely. As also depicted, there is a client 406 having an application 408 that enables secure channels to be established and maintained over a network. A typical application 408 is OpenSSL or the like, which implements the SSL/TLS protocol in a known manner. This is not a limitation, however, as the functionality herein may be implemented in or in association with any application, utility, operating system, or otherwise. According to this disclosure, application 408 implements or has associated therewith program code 410 that provides for a client public key acceptance policy function of this disclosure. As described, preferably the client public key acceptance policy is applied over multiple certificate chains.

Figure 5:
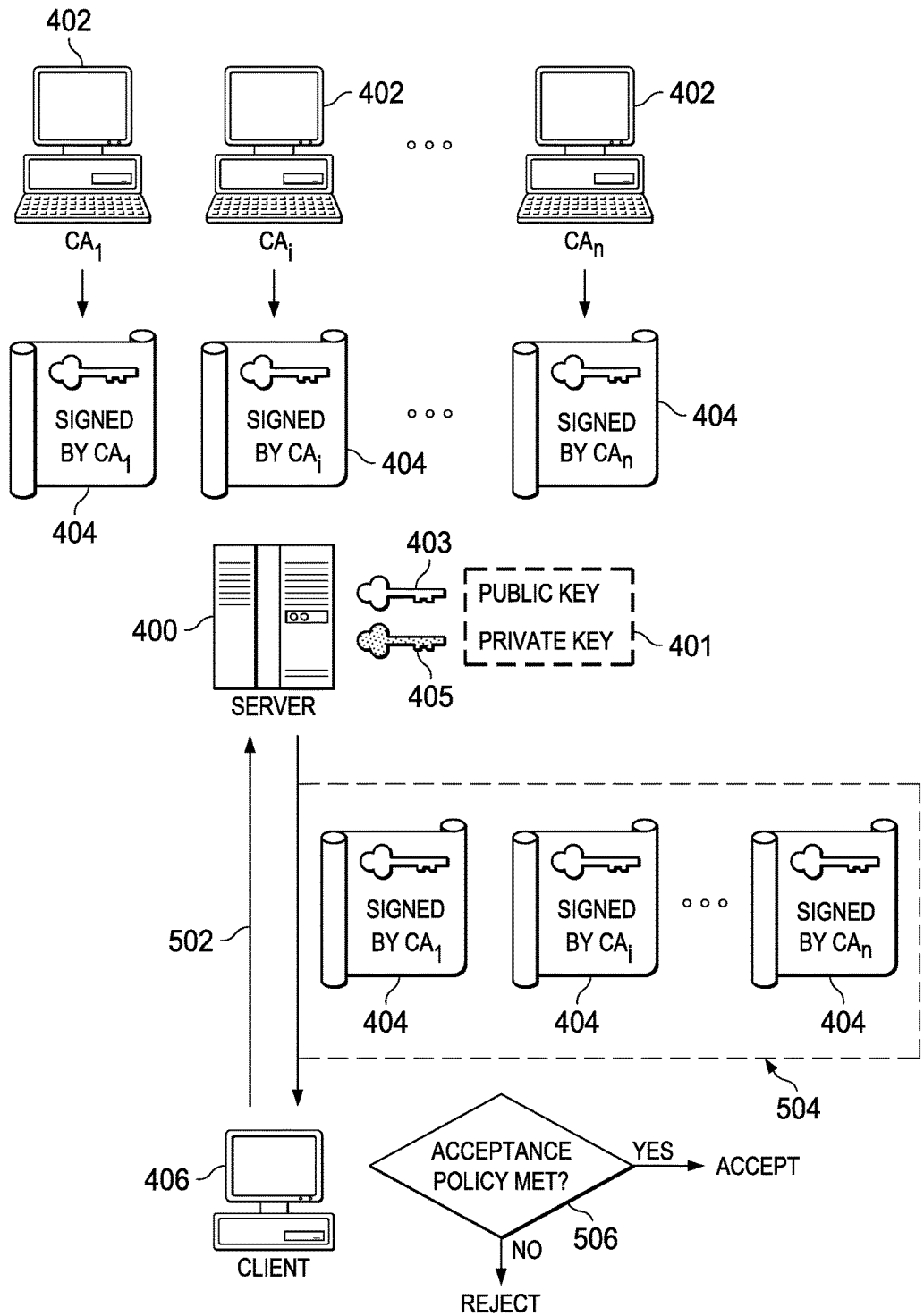
FIG. 5 depicts the basic client-server interaction according to this disclosure by which the client can determine whether to accept the server's public key.

FIG. 5 depicts the client making a request 502 to initiate a secure channel to the server. The request 502 may be associated with other than a connection request. The server returns a response 504, which comprises the set of certificates that the server obtained from the certificate authorities (as described above with respect to FIG. 4). Typically, the server returns all of the certificates for its public key, but this is not a requirement, as the server may elect to return a subset thereof, or particular certificates. Regardless of how many certificates are provided, it is required that the server provide the client multiple certificate chains for the server's public key, as the client public key acceptance policy operates with respect to these multiple chains. With the certificate chains in hand, the client verifies the certificates (and the client can do so because it knows or can obtain the public keys of the certificate authorities) and then applies its policy. If the policy evaluates true as indicated by 506, the server public is accepted and the secure channel setup can continue.

Figure 6:
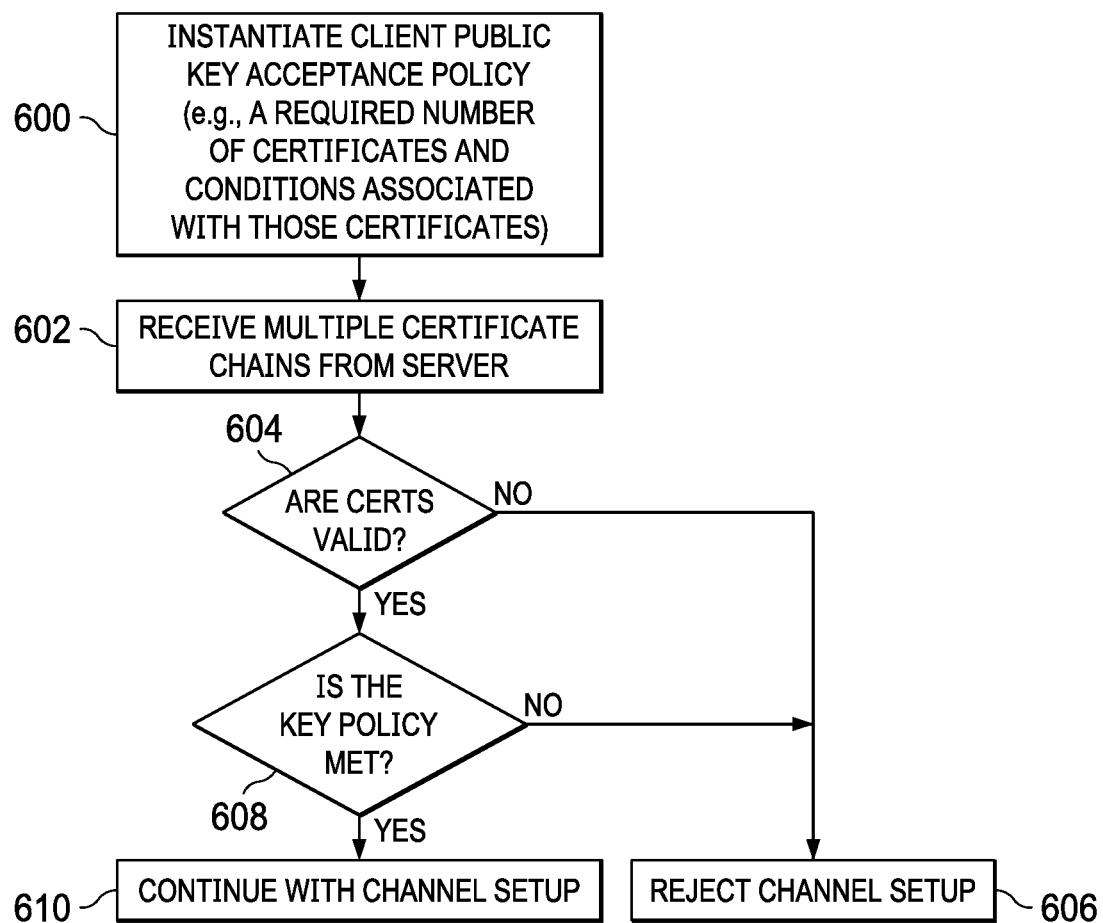
FIG. 6 depicts a process flow of the basic technique of this disclosure.

FIG. 6 depicts the client-side operation in additional detail. At step 600, the client instantiates its client public key acceptance policy. This operation may occur in a pre-processing stage (or at least prior to the secure channel setup request depicted in FIG. 5). Preferably, the client public key acceptance policy is instantiated in secure memory in the client so that it cannot be compromised. At step 602, the client receives the multiple certificate chains from the server. As noted, typically step 602 occurs in association with (or in response to) the client making a request to establish the secure channel. At step 604, the client determines whether it can verify the certificates. If the outcome of the test at step 604 fails, e.g., because a certificate chain cannot be verified, the processes branches to step 606 to reject the secure channel setup. If, however, the outcome of the text at step 604 is positive, the routine continues at step 608 by applying the client public key acceptance policy. The notion of applying the policy typically involves evaluating a "trust function" over the certificate chains and comparing the result with a configurable threshold. If that threshold is met, the server public key is deemed to meet a client threshold level of trust, in which case the channel setup continues at step 610. If, however, the result of evaluating the trust function does not meet the client threshold level of trust established in the policy, once again the setup is rejected at step 606.

Steps 604 need not be a separate step but may comprise part of the client public key acceptance policy. Thus, steps 604 and 608 may be a single operation, and the notion of satisfying the client public key acceptance policy may include the initial certificate verification. When these operations are conflated or combined, the policy itself may not require that all certificates validate before applying additional conditions specified in the policy.

Thus, and according to this disclosure, when a client or client system contacts a server or server system to establish a secure channel, the server provides the client with multiple certificates (of the server's public key) issued by different CAs. The client then validates all the certificates of the public key. The client knows the public key(s) of the certificate issuers necessary for validating the server's public key certificates. If all certificates verify, the client accepts the server public key based on certificate chains with non-overlapping root or intermediate certificate authorities among the certificate chains, and that satisfy the client's public key acceptance policy. The client then proceeds with encrypting the secret key or key material using the server's public key to establish the channel secure. If any certificate verification fails, or if the client's public key acceptance policy fails, the client terminates contact with the server. Preferably, the client public key acceptance policy specifies a required number of valid, non-overlapping certificate chains for a server key whose issuers accumulatively exceed the client's threshold level for trust.

The particular trust function that must evaluate true before the client accepts the server public key may be quite varied. In one embodiment, the trust function requires at least some subset "k" out of "n" certificate authorities to be considered trustworthy, where k is at least 2. In another embodiment, the client uses or accesses reputation models to compute a weighted trust metric over the certificate chains presented. If the weighted trust metric exceeds a threshold, then the server public key is accepted. Other factors that may be used by a trust function to determine whether a CA is trustworthy may include, without limitation, the CA's geo-location, the degree to which the user's credential is authenticated or validated before a certificate is issued to the user, a number of reported security incidents against the CA, the number of revoked certificates due to having been improperly issued by the CA, and so forth.

Generalizing, the client applies a "trust function" over the certificate chains provided by the server to decide on the server's trustworthiness. There is no particular requirement that the public key acceptance policy implement a specific trust function, and a particular public key acceptance policy may implement one or more trust functions each of which must then be met before the server public key is accepted. When more than one trust function must be met (to satisfy the policy), these functions may be applied sequentially, or concurrently. As noted, more complex trust functions may be instantiated as desired.

Also, a client may have one or more client public key acceptance policies. One or more policies may be default policies, or a policy may be configured (either manually, automatically or programmatically). A particular public key acceptance policy may be instantiated on the client in association with an event, an occurrence, a condition, or the like. Thus, a first client public key acceptance policy may be implemented for a first server, and a second client public key acceptance policy may be implemented for a second server. Or, the particular policy implemented may depend on the protocol (e.g. HTTPS or FTPS) over which the communication is being established. Or, the particular policy may depend on a time of day, or some other condition or occurrence. A client may determine that the policy should be implemented only for some connections but not others, or periodically, or according to some other constraint. Some other external trigger may also cause the client to apply its public key acceptance policy. A client may also determine that it should apply multiple different policies to a particular connection attempt before validating the server public key.

There may be a repository of client public key acceptance policies that are managed by a third party entity that provides these policies as a service.

A typical client implementation of the public key acceptance policy is as a computer program (one or more sets of program instructions) executed by a hardware processor. The computer program instructions may be standalone instructions or native to some other functionality, such as a web browser, an application server, or the like. The particular instructions may be downloaded and installed on the client, or they may be present natively.

The approach of this disclosure thus provides for a "layered defense" that increases the number of CAs an attacker must compromise to acquire valid certificates. The technique may be carried out in a standalone manner, but more typically it is associated within some existing secure channel setup mechanism. A particular implementation is the existing SSL/TLS framework to support the verification of multiple certificate chains for a server public key when establishing the session security keys. When a client contacts a site and engages in the SSL/TLS handshake, the site returns a set of certificate chains for its public key from different CAs. The client proceeds to verify all certificates for the public key. If the certificates pass validation, the client proceeds with handshaking protocol to establish the session keys. If validation fails, the client sends an illegal parameter message and both parties terminate the connection. Currently for server-side authentication, the SSL/TLS protocol requires servers to provide a single certificate or certificate chain in which each certificate verifies the preceding one in the chain for its public key. According to the technique herein, this existing SSL/TLS framework is modified to support the verification of multiple certificate chains for a server public key when establishing the session security keys. The approach works as follows: when a client contacts a site and engages in the SSL/TLS handshake, the site returns a set of certificates for its public key from different CAs. The client proceeds to verify all certificates for the public key and applies its public key acceptance policy, namely, the trust function. If the certificates pass validation and satisfy the client's public key acceptance policy, the client proceeds with the handshaking protocol to establish the session keys. If validation fails, the client sends an illegal parameter message and both parties terminate the connection.

The technique provides many advantages. As noted above, it increases the number of CAs an attacker must compromise to acquire valid certificates, leveraging the commoditization of public key certification It is a defense-in-layer approach that introduces additional costs to an attacker by increasing the number of CAs that the attacker must compromise in order to masquerade as a legitimate site. An attacker is forced to consider compromising multiple CAs because the client requires more than one certificate to be issued to the site's public key. The technique addresses the deficiencies of prior art approaches, which typically are only useful after the fraudulent certificate has been discovered. As such, the technique allows for more time to respond after the compromise of a CA has been detected.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of recertification processes within such systems.

Having described our invention, what we now claim is as follows:

1. A method to authenticate a server to a client, the server having an associated public key, comprising:

associating "n" distinct certificates to the server's public key, each of the "n" distinct certificates being issued by a distinct certificate authority (CA), wherein each of the distinct certificates has a certification chain with a different root certificate authority, wherein the certificate chains for the "n" distinct certificates are valid and non-overlapping with respect to their intermediate and root CAs;

responsive to the client initiating a request for a secure channel to the server during a cryptographic handshake, providing the client the "n" distinct certificates; and responsive to receipt from the client of an indication that the public key satisfies a client public key acceptance policy, establishing completing the cryptographic handshake to establish the secure channel between the client and the server;

the client public key acceptance policy specifying a required number of valid, non-overlapping certificate chains that must be present to satisfy a client threshold level of trust to thereby improve security of the cryptographic handshake.

2. The method as described in claim 1 wherein the client threshold level of trust is designated by a trust function computed over the certificate chains.

3. The method as described in claim 1 further including requesting the "n" distinct certificates from the distinct certificate authorities.

4. The method as described in claim 1 wherein "n" is greater than 2.

5. An apparatus associated with a server having a public key, comprising:
a processor;
computer memory holding computer program instructions executed by the processor to authenticate the server to a client, the computer program instructions configured to:
associate "n" distinct certificates to the server's public key, each of the "n" distinct certificates being issued by a distinct certificate authority (CA), wherein each of the distinct certificates has a certification chain with a different root certificate authority, wherein the certificate chains for the "n" distinct certificates are valid and non-overlapping with respect to their intermediate and root CAs;
responsive to the client initiating a request for a secure channel to the server during a cryptographic handshake, provide the client the "n" distinct certificates; and
responsive to receipt from the client of an indication that the public key satisfies a client public key acceptance policy, completing the cryptographic handshake to establish the secure channel between the client and the server;
the client public key acceptance policy specifying a required number of valid, non-overlapping certificate chains that must be present to satisfy a client threshold level of trust to thereby improve security of the cryptographic handshake.

6. The apparatus as described in claim 5 wherein the client threshold level of trust is designated by a trust function computed over the certificate chains.

7. The apparatus as described in claim 5 wherein the computer program instructions are further configured to request the "n" distinct certificates from the distinct certificate authorities.

8. The apparatus as described in claim 5 wherein "n" is greater than 2.

9. A computer program product in a non-transitory computer readable medium for use in a data processing system associated with a server, the server having a public key, the computer program product holding computer program instructions which, when executed by the data processing system, are configured to:
associate "n" distinct certificates to the server's public key, each of the "n" distinct certificates being issued by a distinct certificate authority (CA), wherein each of the distinct certificates has a certification chain with a different root certificate authority, wherein the certificate chains for the "n" distinct certificates are valid and non-overlapping with respect to their intermediate and root CAs;
responsive to the client initiating a request for a secure channel to the server, provide the client the "n" distinct certificates; and
responsive to receipt from the client of an indication that the public key satisfies a client public key acceptance policy, completing the cryptographic handshake to establish the secure channel between the client and the server;
the client public key acceptance policy specifying a required number of valid, non-overlapping certificate chains that must be present to satisfy a client threshold level of trust to thereby improve security of the cryptographic handshake.

10. The computer program product as described in claim 9 wherein the client threshold level of trust is designated by a trust function computed over the certificate chains.

11. The computer program product as described in claim 9 wherein the computer program instructions are further configured to request the "n" distinct certificates from the distinct certificate authorities.

12. The computer program product as described in claim 9 wherein "n" is greater than 2.

13. A method to authenticate a server to a client, the server having an associated public key, comprising:
specifying a client public key acceptance policy, the client public key acceptance policy identifying a required number of certificates for the server public key that must be received from the server, and a trust function that is applied over information in the certificates and that must be satisfied to establish a client threshold level of trust;
responsive to the client initiating a request for a secure channel to the server during a cryptographic handshake, receiving from the server "n" distinct certificates, each of the "n" distinct certificates having been issued to the server by a distinct certificate authority (CA);
determining whether the "n" distinct certificates are valid;
responsive to a determination that the "n" distinct certificates are valid and are non-overlapping with different root certificate authorities, determining whether certificate chains specified by the received certificates satisfy the trust function of the client public key acceptance policy; and
responsive to a determination that the certificate chains specified by the received certificates satisfy the trust function of the client public key acceptance policy, completing the cryptographic handshake to establish the secure channel;
wherein applying the client public key acceptance policy improves security of the cryptographic handshake.

14. The method as described in claim 13 wherein the trust function applies a trust metric over certificate chains in the received certificates.

* * * * *